United States Patent
Oteri et al.

(10) Patent No.: US 9,014,025 B2
(45) Date of Patent: Apr. 21, 2015

(54) SYSTEM AND METHOD FOR COORDINATING DIFFERENT TYPES OF BASE STATIONS IN A HETEROGENEOUS COMMUNICATIONS SYSTEM

(75) Inventors: Oghenekome Oteri, San Diego, CA (US); Cornelius van Rensburg, Wylie, TX (US); Weimin Xiao, Hoffman Estates, IL (US)

(73) Assignee: Futurewei Technologies, Inc., Plano, TX (US)

( * ) Notice: Subject to any disclaimer, the term of this patent is extended or adjusted under 35 U.S.C. 154(b) by 627 days.

(21) Appl. No.: 13/252,646

(22) Filed: Oct. 4, 2011

(65) Prior Publication Data

US 2012/0082052 A1    Apr. 5, 2012

Related U.S. Application Data

(60) Provisional application No. 61/389,565, filed on Oct. 4, 2010, provisional application No. 61/411,307, filed on Nov. 8, 2010.

(51) Int. Cl.
*H04W 24/10* (2009.01)
*H04W 16/10* (2009.01)

(52) U.S. Cl.
CPC .............. *H04W 24/10* (2013.01); *H04W 16/10* (2013.01)

(58) Field of Classification Search
CPC ... H04L 15/0057; H04L 12/26; H04W 24/10; H04W 16/10
USPC ................................................ 370/252, 332
See application file for complete search history.

(56) References Cited

U.S. PATENT DOCUMENTS

| | | | |
|---|---|---|---|
| 2009/0175232 A1 | 7/2009 | Kolding | |
| 2009/0257390 A1 | 10/2009 | Ji et al. | |
| 2009/0270108 A1 | 10/2009 | Xu | |
| 2010/0041344 A1* | 2/2010 | Kim et al. | 455/69 |
| 2010/0173637 A1 | 7/2010 | Damnjanovic et al. | |
| 2010/0238821 A1* | 9/2010 | Liu et al. | 370/252 |
| 2011/0275394 A1* | 11/2011 | Song et al. | 455/509 |
| 2012/0082052 A1* | 4/2012 | Oteri et al. | 370/252 |
| 2012/0082101 A1* | 4/2012 | Gaal et al. | 370/329 |

FOREIGN PATENT DOCUMENTS

| | | |
|---|---|---|
| CN | 101222726 A | 7/2008 |
| CN | 101291512 A | 10/2008 |

(Continued)

OTHER PUBLICATIONS

"Enhanced Inter-cell Interference Coordination for Heterogeneous Networks in LTE-Advanced: A Survey"; Lindbom et al.; Dec. 7, 2011.*

(Continued)

*Primary Examiner* — Benjamin H Elliot, IV
(74) *Attorney, Agent, or Firm* — Slater & Matsil, LLP

(57) ABSTRACT

A system and method for coordinating different types of base stations in a heterogeneous communications system are provided. A method of communications controller operations includes signaling an indicator of a subset of a plurality of communications resources controlled by a communications controller to a user equipment, and receiving a report comprising channel information associated with a measurement of signals transmitted in the subset from the user equipment.

29 Claims, 8 Drawing Sheets

(56) References Cited

FOREIGN PATENT DOCUMENTS

| CN | 101296508 A | 10/2008 |
|---|---|---|
| CN | 101321385 A | 12/2008 |
| EP | 2096886 A1 | 9/2009 |

OTHER PUBLICATIONS

International Search Report, Applicant: Huawei Technologies Co. LTD, International Application No. PCT/CN2011/080517, Jan. 19, 2012, 10 pages.

Chinese Search Report, CN Application No. 2011800046762, Aug. 6, 2013, 2 pages.

Extended European Search Report, Application No. 11830228.0, date Sep. 23, 2013, 8 pages.

"eICIC CSI feedback requirements," Qualcomm Incorporated, R4-103791, 3GPP TSG-RAN WG4 2010 AH #4, Oct. 11-15, 2010, 2 pages, Xi'an, China.

"Summary of the description of candidate eICIC solutions," CMCC (Rapporteur), R1-105081, 3GPP TSG-WG1 #62, Aug. 23-27, 2010, 6 pages, Madrid, Spain.

"LS on eICIC progress in RAN1," R1-105083, 3GPP TSG-WG1 #62, Aug. 23-27, 2010, 2 pages, Madrid, Spain.

"LS on eICIC progress in RAN1," R1-105094, 3GPP TSG-WG1 #62, Aug. 23-27, 2010, 2 pages, Madrid Spain.

"Way Forward on time-domain extension of Rel 8/9 backhaul-based ICIC," R1-105779, TSG-RAN WG1 Meeting #62bis, Oct. 11-15, 2010, pp. 1-4, Xi'an P.R. China.

"Signaling and UE Behaviors for Resource-Specific CSI Measurements," R1-105852, 3GPP TSG RAN WG1 meeting #63, Nov. 15-19, 2010, 4 pages, Jacksonville, USA.

"$3^{rd}$ Generation Partnership Project; Technical Specification Group Radio Access Network; Evolved Universal Terrestrial Radio Access (E-UTRA); User Equipment (UE) radio transmission and reception (Release 9)," 3GPP TS 36.101, V9.4.0, Jun. 2010, 183 pages.

"$3^{rd}$ Generation Partnership Project; Technical Specification Group Radio Access Network; Evolved Universal Terrestrial Radio Access (E-UTRA); Physical Layer Procedures, (Release 9)," 3GPP TS 36.213, V9.3.0, Sep. 2010, 80 pages.

"$3^{rd}$ Generation Partnership Project; Technical Specification Group Radio Access Network; Evolved Universal Terrestrial Radio Access (E-UTRA); Further advancements for E-UTRA Physical Layer Aspects (Release 9)," 3GPP TR 36.814, V9.0.0, Mar. 2010, 3 pages.

"$3^{rd}$ Generation Partnership Project; Technical Specification Group Radio Access Network; Evolved Universal Terrestrial Radio Access (E-UTRA); FDD Home eNode B (HeNB) Radio Frequency (RF) requirements analysis (Release 9)," 3GPP TR 36.921, V9.0.0, Mar. 2010, 45 pages.

\* cited by examiner

INTERCELL INTERFERENCE (DOTTED)

RX POWER (SOLID, DOTTED (MACRO CELL), 1/PATHLOSS (DASHED)

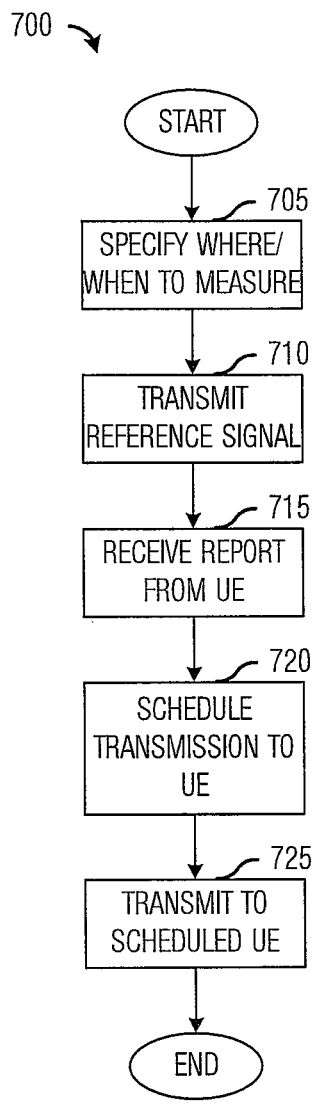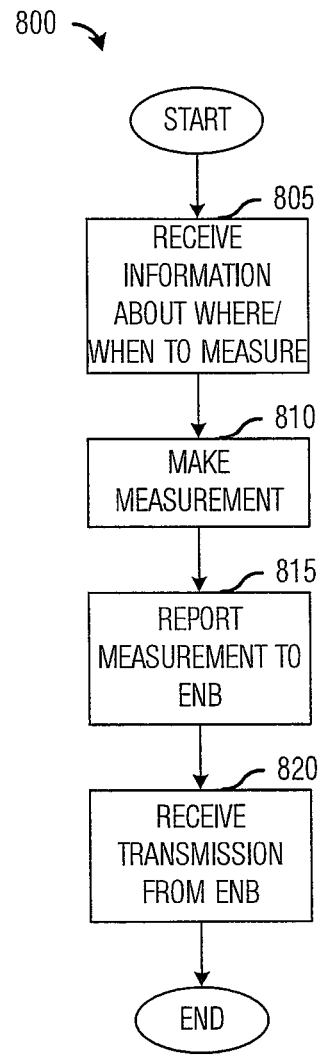
Fig. 7
Fig. 8

US 9,014,025 B2

SYSTEM AND METHOD FOR COORDINATING DIFFERENT TYPES OF BASE STATIONS IN A HETEROGENEOUS COMMUNICATIONS SYSTEM

This application claims the benefit of U.S. Provisional Application No. 61/389,565, filed on Oct. 4, 2010, entitled "System and Method for Coordinating Different Types of Base Stations in a Heterogeneous Communications System," and No. 61/411,307, filed on Nov. 8, 2010, entitled "Systems and Methods for Resource-Specific Channel State Information Measurements," which applications are hereby incorporated herein by reference.

TECHNICAL FIELD

The present invention relates generally to digital communications, and more particularly to a system and method for coordinating different types of base stations in a heterogeneous communications system.

BACKGROUND

Generally, heterogeneous communications systems are those in which low power nodes (LPN), also commonly referred to as low power cells, femto cells, pico cells, relay nodes, hot spots, home enhanced NodeBs (HeNB), and so on, are placed throughout a macro cell layout. The LPNs may transmit/receive transmissions in the same spectrum as the macro cells in the macro cell layout.

The macro cells are conventional base stations that use a dedicated backhaul and are open to public access. They typically transmit at relatively high power levels, for example, at about 43 dBm. Pico cells are LPNs that also use a dedicated backhaul and are also open to public access but have lower transmit powers (typically 23-30 dBm) and are lower cost. Femto cells or HeNBs are consumer deployable base stations that use the consumer's broadband connection as the backhaul and may or may not have restricted association (as a closed subscriber group or CSG, for example).

SUMMARY OF THE INVENTION

Technical advantages are generally achieved by embodiments of the present invention which provide a system and method for coordinating different types of base stations in a heterogeneous communications system.

In accordance with an example embodiment of the present invention, a method of operating a communications controller is provided. The method includes signaling an indicator of a subset of a plurality of communications resources controlled by the communications controller to a user equipment. The method also includes receiving a report comprising channel information associated with a measurement of signals transmitted in the subset from the user equipment.

In accordance with another example embodiment of the present invention, a method for operating a user equipment is provided. The method includes receiving an indicator of a subset of a plurality of communications resources controlled by a communications controller from the communications controller, where the indicator indicates to the user equipment to measure signals transmitted in the subset. The method also includes measuring the signals transmitted in the subset, and reporting channel information associated with the measurement to the communications controller.

In accordance with another example embodiment of the present invention, a communications controller is provided. The communications controller includes a processor, a transmitter coupled to the processor, and a receiver coupled to the processor. The processor determines a subset of a plurality of communications resources controlled by the communications controller, and generates an indicator of the subset. The transmitter transmits the indicator, and the receiver receives a report comprising channel information associated with a measurement of signals transmitted in the subset from a user equipment.

In accordance with another example embodiment of the present invention, a user equipment is provided. The user equipment includes a receiver, a processor coupled to the receiver, and a transmitter coupled to the processor. The receiver receives an indicator of a subset of a plurality of communications resources controlled by a communications controller from the communications controller, where the indicator indicates that the user equipment is to measure signals transmitted in the subset. The processor measures the signals transmitted in the subset, and generates channel information based on the measurement. The transmitter transmits the channel information to the communications controller.

One advantage of an embodiment is that a variety of measurement resources may be specified and used to help reduce interference and/or improve link adaptation in a heterogeneous communications system. A wide range of reference signals, from common, UE-specific, precoded, unprecoded, and so forth, are also supported.

A further advantage of an embodiment is that coordinated beam switching is also supported to help mitigate interference.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which:

FIGS. 4a through 4c illustrate example network resources available for use in heterogeneous communications system of FIG. 3 according to example embodiments described herein;

FIG. 5 illustrates an example allocation of network resources in heterogeneous communications system of FIG. 3, wherein network resources corresponding to a second time slot may be used by a femto layer, while network resources corresponding to a first, third, fourth, and fifth time slots may be used by a macro layer according to example embodiments described herein;

FIGS. 6a through 6c illustrate example allocations of network resources to beam groups in a femto layer of heterogeneous communications system of FIG. 3 according to example embodiments described herein;

FIG. 7 illustrates an example flow diagram of eNB operations for transmitting to a UE that an eNB is serving, wherein the eNB and the UE are operating in a heterogeneous communications system according to example embodiments described herein;

FIG. 8 illustrates an example flow diagram of UE operations in receiving transmissions from an eNB serving a UE according to example embodiments described herein;

DETAILED DESCRIPTION OF ILLUSTRATIVE EMBODIMENTS

The making and using of the presently example embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a heterogeneous communications system adherent to the Third Generation Partnership Project (3GPP) Long Term Evolution (LTE) technical standards. The invention may also be applied, however, to other heterogeneous communications systems.

Figure 1A:
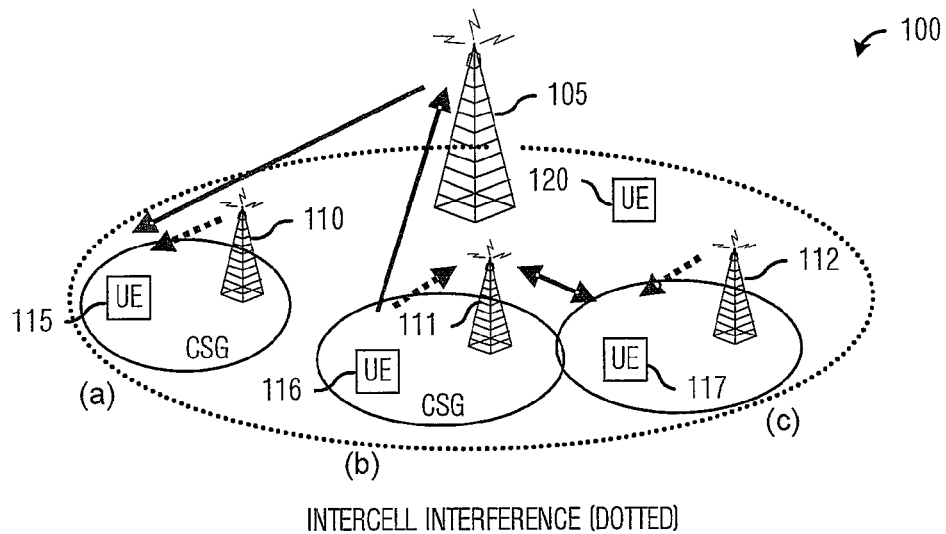
FIG. 1a illustrates examples of interference in a heterogeneous communications system.

FIG. 1a illustrates examples of interference in a heterogeneous communications system 100. As shown in FIG. 1a, heterogeneous communications system 100 includes a macro cell 105 and several low power nodes (LPN), such as LPN 110, LPN 111, and LPN 112, with some of the LPNs (e.g., LPN 110 and LPN 111) operating in a closed subscriber group (CSG), wherein only user equipment (UE), such as UE 115 and UE 116, that is a member of a particular CSG may communicate to a LPN serving the particular CSG. Other LPNs may operate with open subscriber group (OSG) without a CSG, for example, LPN 112, serving all authorized and authenticated UEs, such as UE 117. Heterogeneous communications system 100 also includes a macro user 120.

In a heterogeneous communications system, interference profiles may vary widely. As an example, FIG. 1a illustrates the following interference profiles:
a) a macro user with no access to a CSG suffers interference from the LPNs;
b) a macro user causes interference to the LPNs; and
c) CSG communications causes interference to other LPNs and CSGs.

Figure 1B:
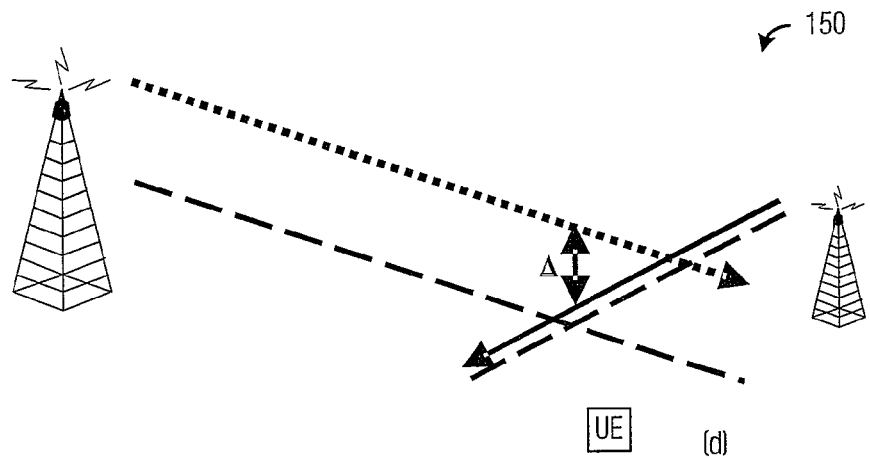
FIG. 1b illustrates an example path loss in a heterogeneous communications system.

FIG. 1b illustrates path loss in a heterogeneous communications system 150. As shown in FIG. 1b, path loss based cell association may improve uplink (UL) communications, but may increase downlink (DL) interference of non-macro users at cell edge, i.e., cell edge users. Alternatively, received signal power level and/or received signal quality based cell association may cause UL interference from the macro cell users to the LPNs.

In heterogeneous communications systems, there may be need for interference management on the data channels, Layer One and/or Layer Two (L1/L2) control signaling, synchronization signals and reference signals. Each eNB type in this case is called a cell layer. Existing interference management schemes can be classified into 3GPP LTE Release 8/9 (Rel 8/9) type schemes and non-Rel 8/9 schemes.

Rel 8/9 schemes include:
Use different carrier frequencies for different cell layers.
Restrict transmission power during part of time for one cell layer.
Various power control schemes.

Non-Rel 8/9 schemes may be based on carrier aggregation or non carrier aggregation type schemes. With carrier aggregation (CA), cross-carrier scheduling is performed using a Carrier Indicator Field (CIF). The control for the different layers is transmitted on separate carriers and data uses downlink interference coordination as in 3GPP LTE Rel-8. Non-CA interference management schemes may be in time, frequency, space, and/or power [see 3GPP TS 36.814, Section 9a, for additional information]. In addition to time domain enhanced inter-cell interference coordination (TD-eICIC), coordinated beam switching (CBS) may be used to manage interference in both homogeneous and heterogeneous communications systems.

With the interference coordination in time, frequency, and/or spatial domain, the use of a resource specific measurement mode (or similarly, resource specific CSI measurement mode) enables the UE to measure the interference corresponding to a specific set of time resources (for example, subframes, OFDM symbols, and etc.) and/or frequency resources (for example, subbands, carriers, and etc.) to better reflect the interference levels in systems and to improve the quality of measurement and link adaptation accuracy in any of these scenarios. The specific resource for measurements may be signaled by the macro cells and/or LPNs.

As an example, in the following, two methods in which the CBS may be implemented are demonstrated, and highlight the network requirements and UE requirements (such as reference signal type, control signaling and UE measurement techniques) needed to implement both methods.

Method 1: Precoded reference symbol for CQI measurements with full standards support. Method 1 assumes that all the standardization requirements for CBS are met. Method 1 shows the upper bound performance without any restrictions from the specification.

Network Requirements: The network signals an explicit switch to the CBS mode. A precoded Channel State Information Reference Sequence (CSI-RS) is broadcast to the entire cell when the network is in the CBS mode and the UE performs channel quality measurements based on the precoded CSI-RS. In addition, a CBS period is signaled to all the UEs in the cell. The system can be configured to allow for UE specific CBS signaling, i.e., some UEs are in CBS mode while others in different frequency bands use a non-precoded CSI-RS or the common reference sequence (CRS).

UE Requirements: The UE reports the best sub-band channel quality indicator (CQI) over the CBS cycle period based on the precoded CSI-RS. The feedback specification is such that the CQI is tied to a specific sub-band and a specific sub-frame in the CBS period which implies certain restrictions on the UE's measurement averaging window and methods for both signal and interference. The UE is not aware of the beam switching pattern other than the period of the pattern and the sub-band size.

Method 1 allows for implicit signaling of the CBS pattern between the UEs and the eNBs. This is because reporting the time/frequency information with the CQI information allows the eNB to know the optimal beam, the effect of interference and the corresponding CQI for the UE in question without a need to signal the actual CBS pattern.

Modifications in the existing specification that may be needed for Method 1 to work include: explicit signaling to switch between a CBS mode and a non-CBS mode; explicit signaling of the CBS Time/Frequency period; a precoded RS broadcast to the entire cells (the precoded RS may be a precoded CSI-RS, a precoded newly-created cell-specific RS, or the existing precoded Demodulation Reference Signal (DMRS) (for example, port 5 in 3GPP LTE Rel-8 converted to use as a measurement RS in the CBS mode); and 3GPP LTE Rel-8 type UE CQI feedback that allows the CQI to be tied to a specific sub-band in a specific subframe.

Method 2: Common RS for CQI measurements with full standards support. In Method 2, it is assumed that the precoded CSI-RS requirement discussed previously is not available. Instead, a common RS (also known as CRS) defined in 3GPP LTE Rel-8 is used. The CBS algorithm is entirely scheduler-based and the eNB makes assumptions about the actual CQI used when the UE is not scheduled in its assigned beam-slot.

Network Requirements: The network signals an explicit switch to the CBS mode. A common RS is transmitted when the network is in CBS mode and the UE performs channel quality measurements based on this RS and the optimal PMI for the UE (as in 3GPP LTE Rel-8). In addition, a beam-switching pattern and a CBS period are signaled to all the UEs in the cell.

UE Requirements: The UE reports the best PMI and corresponding sub-band CQI over the CBS cycle period. The feedback specification is such that the CQI may be tied to a specific sub-band and a specific sub-frame (the resource specific CQI feedback method).

Modifications in the existing specification that may be needed for Method 2 to work include: explicit signaling to switch between a CBS mode and a non-CBS mode; explicit signaling of the CBS Time and/or Frequency period; and Signaling of CBS pattern: and the signaling can be explicit or implicit.

Explicit signaling of the CBS pattern: The eNB broadcasts the beam pattern used to all the UEs to enable them to measure the CQI when their preferred beam is broadcast. The pattern can be signaled by Layer 1 signaling using the PBCH or PDCCH or by Layer 3 signaling at the beginning of a CBS set of transmissions. The UEs may be limited to reporting the CQI/PMI when the beam corresponding to the "best" PMI is sent. Alternatively, the eNB broadcasts the index of the beam sent in the current subframe and the UE measures the CQI when its preferred beam is broadcast.

Implicit signaling of the CBS pattern: The eNB polls the UE and orders the UE to measure the CQI in a specific subband and/or subframe based on its PMI feedback.

Resource specific CQI feedback: 3GPP LTE Rel-8 type UE CQI feedback that allows the CQI to be tied to a specific sub-band in a specific subframe.

Ideas of example embodiments presented herein include:

1. Signaling and/or definition for resources used for UE measurements. The measurements can be for channel state information reporting. The measurements can also be for Radio Link Monitor (RLM) and/or Radio Resource Management (RRM), for example, Reference Signal Received Power (RSRP) and Reference Signal Received Quality (RSRQ).

2. Interaction between Resource Specific measurements and the Reference Signal. The relationship between the measurements and the reference signal may be different for different coordination scenarios, such as CBS and TD-eICIC. The reference signal used for resource-specific measurements may include cell-specific RS, common RS, channel state information RS (CSI-RS), UE-specific RS, DM-RS. The reference signal used for resource-specific measurements may be precoded or un-precoded. Multiple types of reference signals may be used jointly for resource-specific measurement.

3. eICIC for heterogeneous communications systems by partial orthogonality in frequency, time, and/or spatial domain.

In order to convey the specific resources in time and/or frequency domain that a UE may measure on for CSI feedback and/or for RLM/RRM measurement report, the information may be signaled as Cell Specific (broadcast to all the UEs served by the cell), UE Specific (to an individual UE), Grouped (multi-cast to a group of UEs) or Polled (to an individual UE or a group of UEs). It is noted that the measurement resource needs not to be the same for all the UEs within a cell. For example, in case of time domain eICIC, only the UEs that are in close proximity of an aggressor cell (which mutes a subset of its subframes, for example) may need to be signaled of the measurement resource pattern related to the muting pattern of the aggressor cell. For other use cases, for example, frequency domain ICIC using relative narrow-band transmit power (RNTP) message or time domain coordination through power control of the data transmission portion of the subframes, different signaling approaches may be preferred. A straightforward solution may be to use a dedicated signal(s) to convey such information to each applicable UE. This will then not preclude, by implementation, other approaches such as cell-specific configuration.

To convey the detailed information of the measurement resource, a measurement duty cycle may be assumed naturally. The largest duty cycle needed for most of the use cases may be defined, for example, to be 10 or 40 subframes as in the case of multicast/broadcast single frequency network (MBSFN) configurations. Although 10 and 40 subframes are listed as examples, the embodiments described herein may be operable with any number of subframes.

The eNBs inform the UE(s) of the set(s) of subframes and/or the set(s) of subbands in the measurement period to be measured. One possible way to signal the possible measurement resource is to construct a table with all valid subframe configurations. Each entry in the table indicates a resource specific measurement subframe configuration. Alternatively, a bitmap may be used to signal the time-frequency pattern of the measurement resource.

In case of time domain resource specific measurements, the UE behavior may be defined or configured on how the averaging and/or filtering may be performed. For example: the measurements may be configured to limit to each single subframe that configured to be a measurable subframe; the measurements may be filtered across all the subframes that are configured to be measurable; and the measurements may be averaged and/or filtered only across every N subframes where N is the measurement period. In addition, multiple measurements may be reported with up to one for each offset within the measurement period.

In case of frequency domain resource specific measurements, the UE behavior may be defined or configured on how the averaging and/or filtering may be performed. For example: the signaling of the measurement resource in frequency domain may configure the measurement in bandwidth unit of PRB, subband, bandwidth part, carriers, component carriers, and etc.; the measurement in frequency domain may only be performed within each configured bandwidth unit with no averaging and/or filtering may be performed across the frequency units when measuring CSI, such as channel information and/or interference level; and the valid bandwidth for measurements may be configured to be limited to part of the system bandwidth.

Certain combinations of time and frequency resource configurations for measurements may be possible. For example, two bitmaps and/or tables can be used to signal the combinations of resource for measurements in time and frequency domain. Alternatively, a joint signaling of the two dimensional time-frequency resource for measurement (for example, a two dimensional bitmap) may be used, for example in the case of RNTP with extended time domain configuration.

It is noted that time and/or frequency resource configured may be used for the measurement at the UE for its serving cell. Alternatively, the time and/or frequency resource configured may be used for the measurement at the UE for its neighboring cell, for example, in the case of RRM measurements.

It is also noted that the measurable resources may be grouped into several sets. Multiple sets of measurable resources may be configured or signaled jointly or signaled separately. UE performs multiple measurements separately on each of these sets of measurable resources and reports the multiple measurement results, correspondingly.

In an example embodiment, the set of resource to be measured on may be derived at the UE. The UE may derive the measurable resource from information related to interference coordination, such as the time-frequency resource muting pattern (for example, MBSFN and/or almost blank subframe (ABS) configuration, and etc.), transmit power setting for specific time-frequency resource (for example, RNTP, and etc.), CBS beam pattern, and etc.

Example Embodiment 1

Signaling of resources for resource-specific UE measurements include: The eNBs signal a cell-specific measurement period and indicate the start of the measurement period to the UEs. a) This may be the same for the entire network (i.e., eICIC) or different for each eNB (for example, CBS). b) Whether cell-specific measurement is used can be configured.

Furthermore, the eNBs inform the UE(s) of the set(s) of subframes and/or the set(s) of subbands in the measurement period to be measured. It is noted that UEs can be grouped and a signal sent to each group.

Alternatively, the cell-specific measurement period may be standardized to a fixed value N and a table constructed with all valid subframe configurations. Each entry in the table indicates a resource specific CQI subframe configuration. An index is sent to each UE to inform the UE on the subframes to be measured.

Alternatively, rather than a bitmap to indicate the subframe configuration, a beam pattern can be signaled and each UE derives a measurement configuration based on matching a subset of beams to the signaled beam pattern.

Furthermore, resource specific RLM, RRM, and/or CSI measurements configuration may be cell specific (broadcast), UE specific (individual), polled (individual or multi-cast), or grouped (multi-cast).

The measurements may be cell specific, making them suitable for TDM eICIC and/or FDM eICIC, and may be signaled using a cell specific bitmap and broadcast to all UEs in the cell. A single subframe (or for greater granularity, subframe and subband) to be measured may be signaled. According to an example embodiment, a bitmap may indicate whether or not a subframe is to be measured, meaning for any bitmap received all subframes flagged are measured. With additional signaling, a bitmap may indicate whether or not a subframe is to be measured or not. The eNB may (a) send a signal to indicate FALSE mode at beginning of resource-specific measurement configuration, therefore, for any bitmap received all subframes flagged are not measured; or (b) send a signal to indicate TRUE mode at beginning of resource-specific measurement configuration, therefore, for any bitmap received all subframes flagged are measured.

Also, to limit the amount of overhead, a measurement signal (e.g., a bitmap) may be transmitted by an aggressor cell only (e.g., with the Broadcast Channel (BCH)). Victim UEs in the victim cell detect this signal and measure on the subframes that are or are not indicated. The same bitmap can be used for RLF, RRM, and CSI measurement. Alternatively, different configurations may be signaled for RLF, RRM, and CSI measurements, respectively. Furthermore, the signal may be transmitted on the BCH or broadcast on a dedicated RLM, RRM, and CSI measurement information channel.

The measurements may be UE specific, making them suitable for TDM/FDM eICIC and CBS. According to an example embodiment, a UE specific bitmap may be sent to each UE individually. UE averages and/or measures only on subframes that match the bitmap. As in the cell specific case, another signal may be added to indicate which subframes to or not to measure. Furthermore, the signal may be transmitted during UE initial access, or on the PDCCH, or on upper layer signaling (dedicated Radio Resource Control (RRC), for example), or a dedicated measurement information channel.

The measurements may be grouped. The UEs may be grouped and a signal sent to each grouping. This is a multicast signal. The measurements may be suitable for TDM and/or FDM eICIC, and allow for CBS with a group corresponding to all UEs on a beam/set of beams. Group size can range from 1 UE (UE specific) to all the UEs in a cell (cell-specific). The signal may include group identifier information, corresponding bitmap, and so forth. There may be also a need to signal to assign UE to a group. For example, in TDM eICIC, in a macro-pico scenario, TDM pattern needed in a single macro (as the victim cell, for example) may differ based on positioning of multiple pico cells in the macro. As such, may need multiple TDM groups within the single macro cell.

The measurements may be polled. This can be individual or multi-cast. The communications system may be placed into a resource-specific measurement mode and specific UEs are polled for measurements at specific subframes and/or subbands. In a simplest case, instantaneous measurements at polled resources. A measurement hysteresis effect may be implemented: (a) send a reset signal, implying that no resources are to be averaged over or the UE is in default 3GPP LTE Rel-8 mode, (b) identify measurement period and start of period, (c) a resource-specific CSI poll indicates single resource to be averaged over, (d) an additional poll indicated additional resource to be averaged over (UE is now averaging over multiple resources in the measurement period), and (e) if there is a need to reset, go to (a). According to an example embodiment, polling occurs in PDCCH (as in 3GPP LTE Rel-8) or upper layer, for example, dedicated RRC signaling.

In the cases, allow for multiple measurement reports to be fed back, with a different report per group. For example, in the simplest case, the UE may feedback separate CQIs in high interference scenario and low interference scenarios. It can get more complicated for grouped TDM, SDM, FDM, and/or CBS.

According to an example embodiment, rather than signaling both the measurement period and the start of the measurement period, it may be possible to signal just the measurement period. The measurement period may be selected to that the start of the measurement period is not critical, thereby allowing the eNB to not have to signal the start of the measurement period.

Figure 2A:
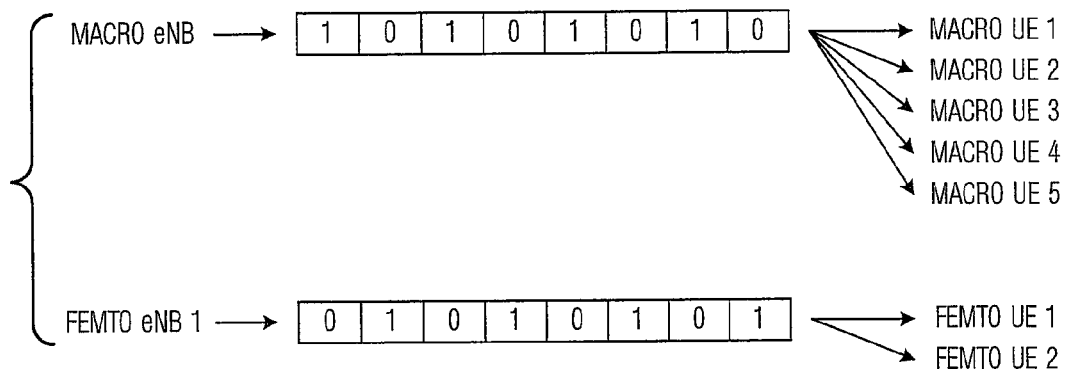
FIGS. 2a through 2d illustrate example transmission of bitmaps to UEs according to example embodiments described herein.

FIG. 2a illustrates a transmission of bitmaps to UEs. As shown in FIG. 2a, both a macro cell (referred to herein as a victim eNB) and a femto cell (referred to herein as an aggressor cell) send cell specific bitmaps to all UEs that they are serving. For example, the macro cell transmits its bitmap to macro UEs 1 through 5 and the femto cell transmits its bitmap to femto UEs 1 and 2.

Figure 2B:
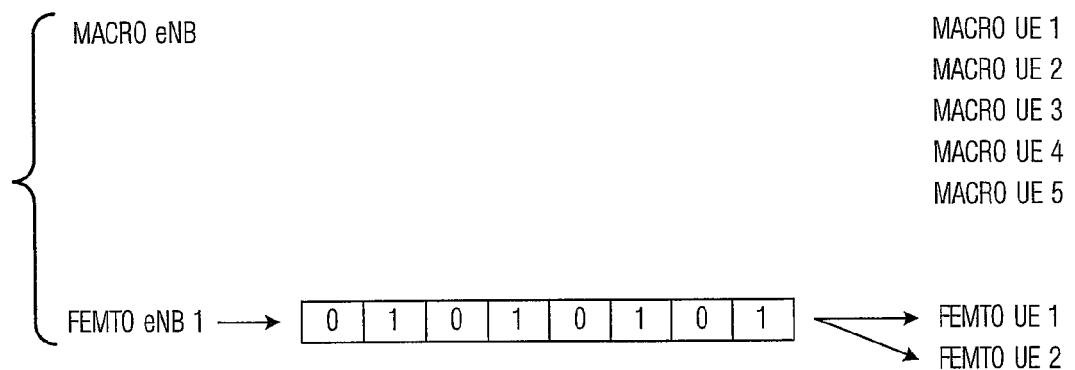

FIG. 2b illustrates a transmission of bitmaps to UEs. As shown in FIG. 2b, only a femto cell (e.g., an aggressor cell) sends cell specific bitmaps to all UEs that it is serving. A macro cell (e.g., a victim eNB) may detect the transmission from the femto cell and derive its own bitmap from the cell specific bitmap sent by the femto cell. For example, the femto cell transmits its bitmap to femto UEs 1 and 2.

Figure 2C:
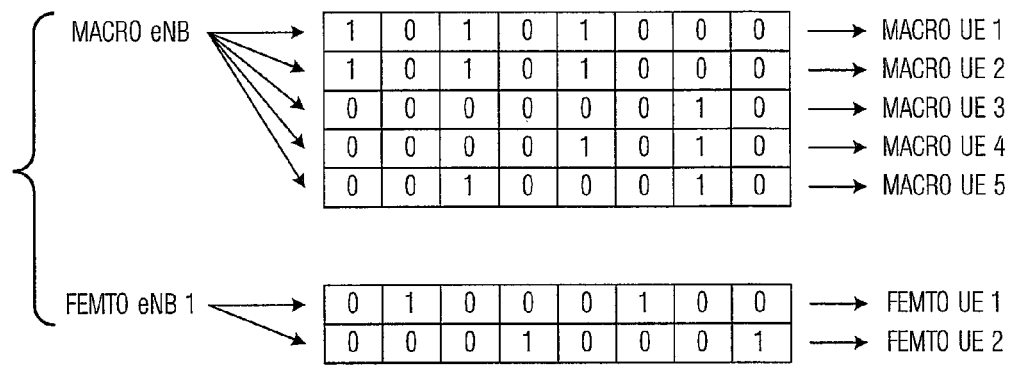

FIG. 2c illustrates a transmission of bitmaps to UEs. As shown in FIG. 2c, both a macro cell (e.g., a victim eNB) and a femto cell (e.g., an aggressor cell) send UE specific bitmaps to all UEs that they are serving. For example, the macro cell transmits its UE specific bitmaps to macro UEs 1 through 5 and the femto cell transmits its UE specific bitmaps to femto UEs 1 and 2, with each UE potentially receiving a different bitmap.

Figure 2D:
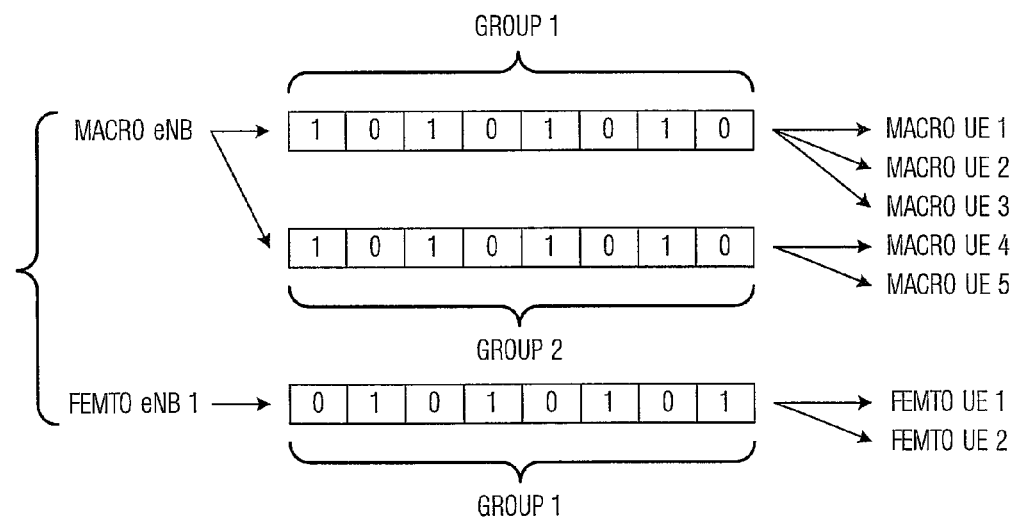

FIG. 2d illustrates a transmission of bitmaps to UEs. As shown in FIG. 2d, both a macro cell (e.g., a victim eNB) and a femto cell (e.g., an aggressor cell) send group specific bitmaps to all UEs that they are serving. For example, the macro cell transmits its group specific bitmaps to macro UE groups 1 and 2 and the femto cell transmits its group specific bitmap to femto UE group 1.

In summary, example embodiment 1 involves a signaling of a cell specific measurement period and a start of the period, wherein a bitmap may be signaled to indicate desired resources to be measured. Alternatively, cell specific measurement periods and bitmaps may be standardized in table or codebook form, and an index to a cell specific measurement period may be signaled. Alternatively, resource-specific measurement and/or report signaling may be cell specific (broadcast), UE specific (unicast), grouped (multicast), or polled (unicast or multicast).

Example Embodiment 2

Interaction between Resource-Specific RLM, RRM, and/or CSI measurements and the Reference Symbol Type in CBS and TD-eICIC include a) UE-specific and/or UE-group-specific Reference symbols. With a precoded UE specific RS (note that the DM-RS can perform this function) and/or unprecoded UE specific RS, the eNB polls the UE and/or group of UEs on reference symbol transmission, the UE and/or the group of UEs measures the effective channel, and if precoded, then the UE and/or the group of UEs feeds back the CQI only, while if unprecoded, then the UE and/or the group of UEs feeds back the CQI and/or PMI.

For Cell Specific and/or Common Reference symbols, with periodic reference symbols, e.g., Channel State Information Reference Symbols (CSI-RS) proposed in 3GPP LTE Release 10 (see method 1 above for CBS) and Precoded CSI-RS (CBS and/or TD eICIC), the UE measures specific resources and feeds back corresponding CQI. There may be no need for any additional PMI feedback in the CBS case, the eNB creates beam cycle and/or Time domain partitioning based on CQI feedback and scheduled UEs accordingly, if there is need for scheduling UEs in a separate beam (in the CBS case), the eNB performs CQI compensation, and yields best possible performance.

For Cell Specific and/or Common Reference symbols, with periodic reference symbols, e.g., Channel State Information Reference Symbols (CSI-RS) proposed in 3GPP LTE Rel-10 (see method 1 above for CBS) and Unprecoded CSI-RS (CBS and/or TD eICIC), the UE measures specific resources (that overlap with the CSI-RS) and feeds back corresponding CQI and PMI, if the eNB has to schedule a UE on a resource that is not specified and/or measured, then CQI compensation is a problem as the interference is not predictable, and yields performance that is slightly worse than the precoded case.

For Cell Specific and/or Common Reference symbols, with periodic reference symbols, e.g., Channel State Information Reference Symbols (CSI-RS) proposed in 3GPP LTE Rel-10 (see method 1 above for CBS) and restricted Periodicity on CSI-RS transmission—given that the subframes with a CSI-RS are restricted, questions regarding CBS and/or TD-eICIC implementation may arise. A possibility includes performing CBS and/or TD eICIC on subframes that transmit the CSI-RS only, with increased periodicity of the CSI-RS to capture the signal strength and/or interference of all the resources that might be used (not standardized) or allow CSI-RS transmission on resources that need to be measured, e.g., measurement polling of the UE+CSI-RS transmission (in this case, the eNB may specify multiple CQI feedback and the averaging group each CSI-RS belongs to). Another possibility includes performing CBS and/or TD eICIC any subframe and use the CRS in the PDCCH to estimate the interference and feedback interference only (the eNB may have to perform CQI compensation in this case).

For Cell Specific and/or Common Reference symbols, with always on reference symbols, e.g., Common Reference Symbols (CRS) as proposed in 3GPP LTE Rel-8 (see Method 2 described previously for CBS), a precoded and/or unprecoded CRS (CBS and/or TD eICIC) may be used. The UE may measure the CQI based on a desired PMI and feeds back both PMI and CQI and the eNB may schedule the UE based on CQI compensation and transmitted beam in the beam cycle and/or time partitioning.

According to an example embodiment, rather than signaling both the measurement period and the start of the measurement period, it may be possible to signal just the measurement period. The measurement period may be selected to that the start of the measurement period may not be critical, thereby allowing the eNB to not have to signal the start of the measurement period.

In summary, Embodiment 2 involves the use of UE specific RS (either precoded or unprecoded), and cell specific and/or common RS (either precoded or unprecoded). Examples of cell specific RS include CSI-RS (periodic and a periodic) and CRS.

Example Embodiment 3 eICIC for heterogeneous communications systems by partial orthogonalization in frequency or space.

As an example, in a heterogeneous communications system, a cell edge UE operating in the macro cell that is not a member of the CSG suffers from severe interference when a femto cell transmits. The existing solution proposes to use a TD-eICIC scheme where the femto cell is silenced at certain intervals to allow for the macro cell UE to transmit. In a heavily loaded femto cell, a drop in performance may occur. Rather than full silencing over the subframe, partial orthogonalization may be performed either by subband silencing or by transmitting on orthogonal or near-orthogonal beams.

Codebooks and/or beams in each layer (e.g., macro, femto) may be divided into multiple beam groups. The beam groups may contain:

(a) No beams and/or codewords, i.e., effectively silencing transmission when the beam group is selected;

(b) Only one beam and/or codeword;

(c) A sub-set of the beams and/or codeword in the codebook; or (d) All the beams and/or codewords in the codebook.

For each scheduling resource (where a scheduling resource can be a subband and/or timeslot or a group of subbands and/or timeslots), a scheduling priority is assigned to each beam group in the coordination time window. The scheduling priority determines if the beam group is to be used. For example, in a scheduler that uses the proportional fair metric, an overall scheduling metric is a function of both the proportional fair metric and the scheduling priority of the beam that is used for the UE transmission. Note that for UEs with a single antenna, the grouping can be based on if the UE is a victim UE or an aggressor UE.

Consider a first illustrative example: At the extreme (e.g., TD eICIC), the scheduling priority for all beam groups in the femto layer is set to zero when the UEs impacted most by the macro cell are transmitting. As an example, assume that the UE is a victim UE in a macro cell. At a time t where the femto cell is transmitting, the scheduling priority for that victim UE in the macro cell is set to zero. Thus, the PF metric is zero and the UE is not scheduled. The time not equal to t when the macro cell is transmitting, the scheduling priority for all the beams in the femto cell are set to zero and the femto cell does not transmit.

Consider a second illustrative example: Alternatively, in the MIMO case, the beam groups that are approximately orthogonal to the impacted UEs in the macro cell are set to zero. This allows the femto cell to transmit while limiting the amount of interference allowed in the macro cell. When the femto cell transmits in a direction that impacts the victim macro UEs, the scheduling priority of the corresponding beams are set to zero, allowing the macro cell to transmit to the non-victim UEs when the femto cell is transmitting. This increases the throughput compared with the explicit TD-eICIC case.

Consider a third illustrative example: Rather than setting the scheduling priority at zero and one as discussed above, the scheduling priority can be changed to a value between zero and one to reflect some metric, e.g., traffic delay, to allow some flexibility.

Figure 3:
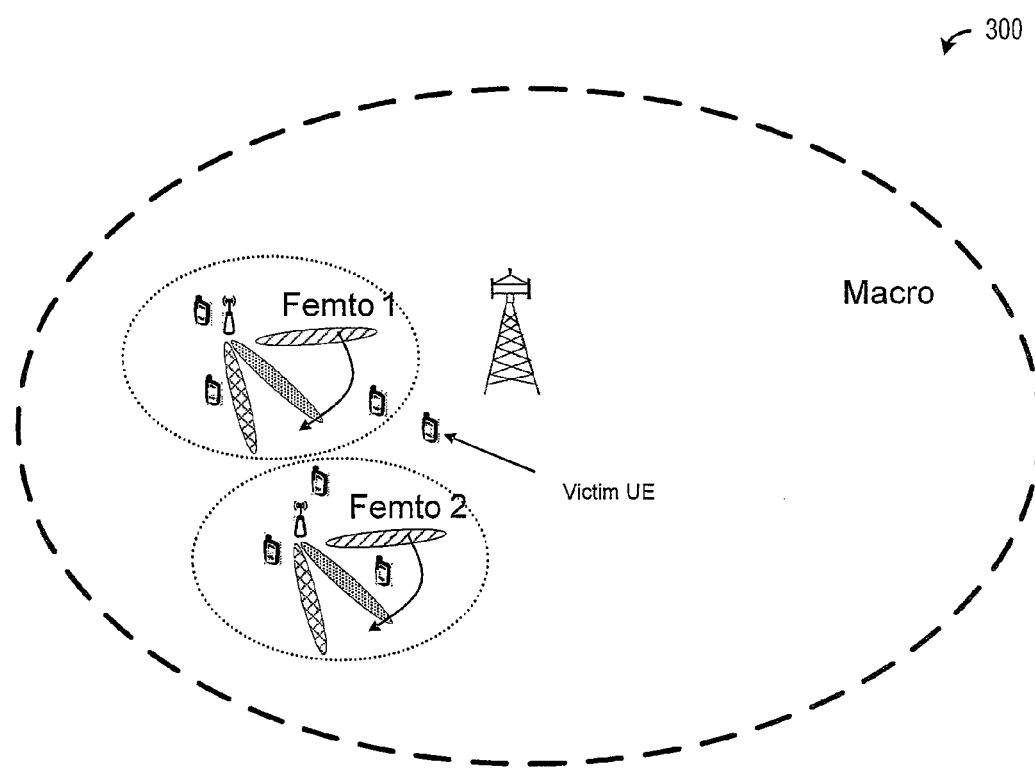
FIG. 3 illustrates an example heterogeneous communications system with a femto layer having three types of UEs according to example embodiments described herein.

Consider a fourth illustrative example: This framework can also be used to implement a TDM (macro layer to femto layer), CBS (femto layer) system as shown in FIG. 3. FIG. 3 illustrates a heterogeneous communications system 300 with a femto layer having three types of UEs. Assume that the femto layer is scheduled in timeslot 2 in the coordination period. The macro beams are classified into one group with scheduling priority of one for timeslots 1, 3, 4, and 5 and a scheduling priority of zero for timeslot 2. The femto layer has a scheduling priority of zero for timeslots 1, 3, 4, and 5 while the beams associated with UE type 1 have priority one in time-slot 2, subbands 1, 2, 3, and so on. This implements a CBS scheme within the femto cell, allowing for some interference management in situations where there may be a high density of femto cells (such as in an apartment building).

Figures 4A, 4B, 4C:
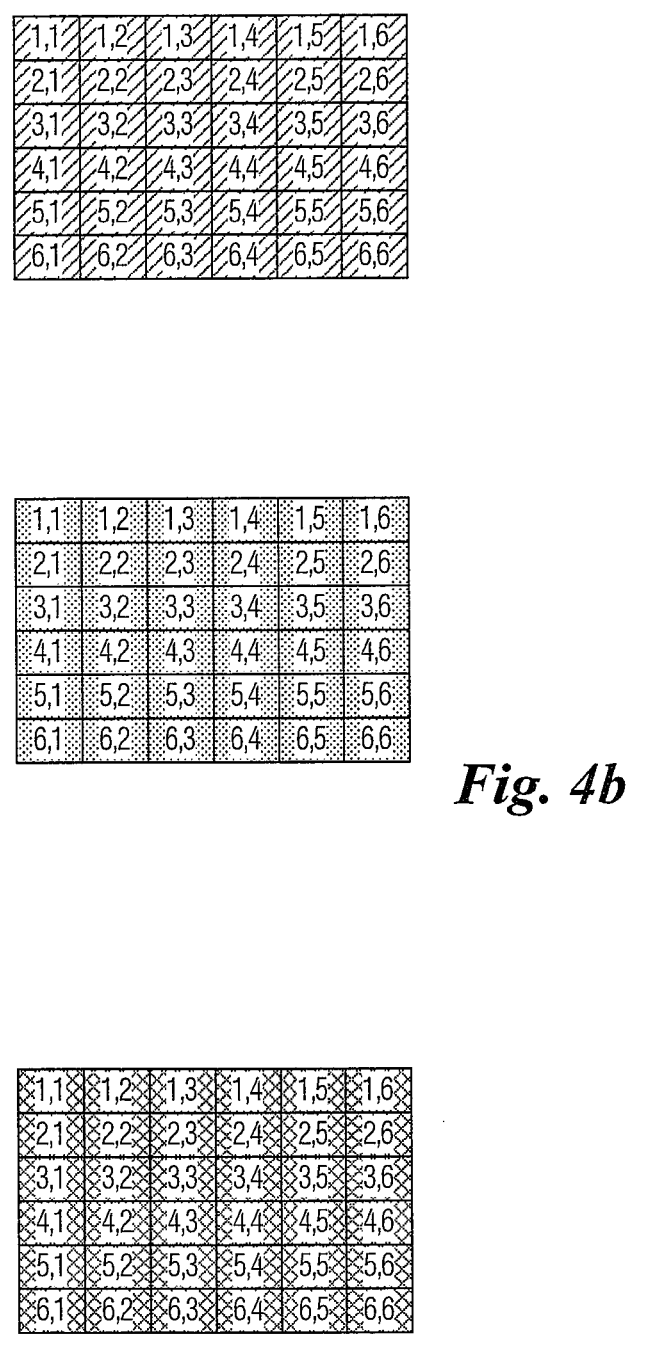
Figures 5, 6A, 6B, 6C:
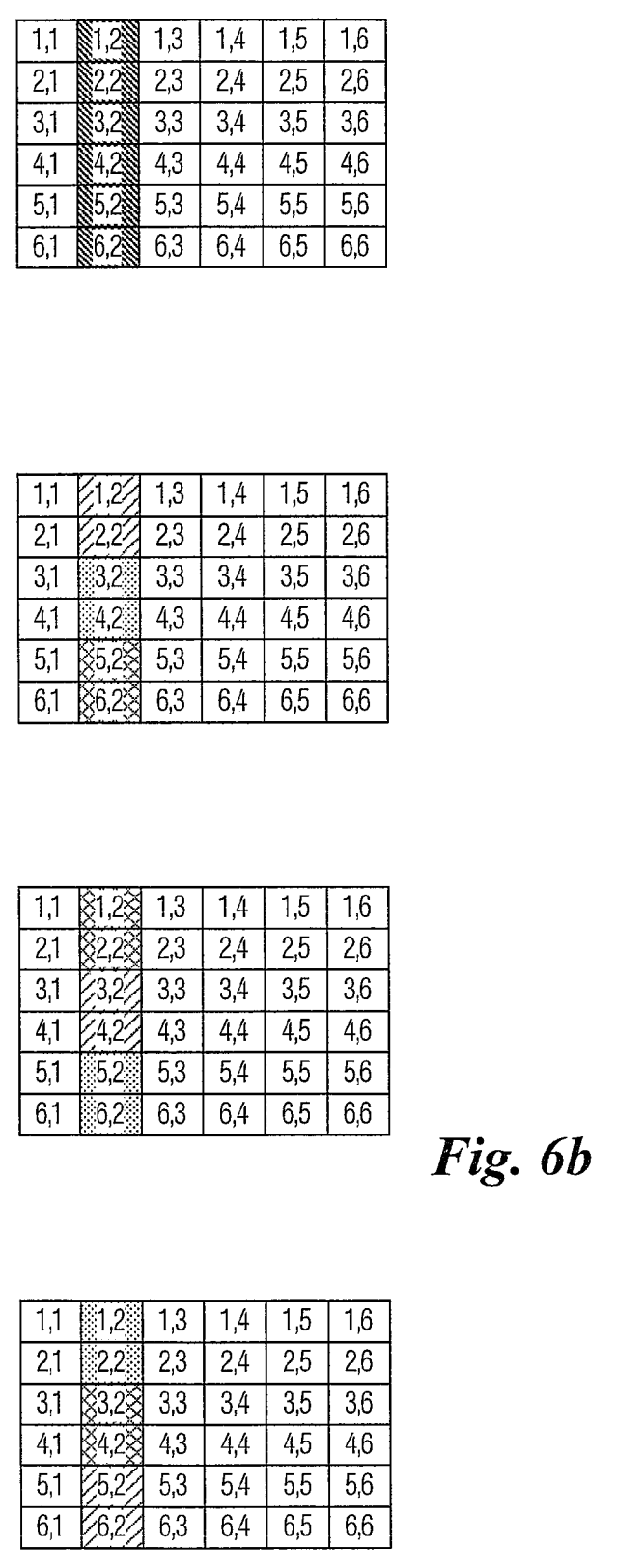

FIGS. 4a through 4c illustrate network resources available for use in heterogeneous communications system 300 of FIG. 3. FIG. 5 illustrates an allocation of network resources in heterogeneous communications system 300, wherein network resources corresponding to a second time slot may be used by a femto layer, while network resources corresponding to a first, third, fourth, and fifth time slots may be used by a macro layer. FIGS. 6a through 6c illustrate allocations of network resources to beam groups in a femto layer of heterogeneous communications system 300.

In summary, example embodiment 3 involves a division of coordinated beamforming into beam groups and assigning a priority to each beam group. If a beam group's priority is zero, then the beam group is not used. If a beam group's priority is one, then the beam group is used. An extension may involve the use of multiple priority levels between zero and one, for example, with TD eICIC. A combination of TD eICIC and CBS/CBF may be possible.

When it comes to making time domain resource-specific measurements, a UE making the measurement has a number of different options at its disposal. Option A: the measurements made by the UE may be limited to a single subframe that can be configured to be a measurable subframe. With Option A, the UE may not need to know the time domain pattern of ABS in order to measure the channel and/or interference; Option B: the measurements made by the UE may be filtered across all the subframes that are configured as being measurable. In Option B, the UE may need to know the measurement pattern (which may be an ABS pattern, for example) in order to average over the appropriate subframes; and Option C: the measurements may be averaged and/or filtered, but only across every N subframes, where N is the measurement period. Additionally, multiple measurements may be reported by the UE. In general, up to one measurement may be reported for each offset within the measurement period. In Option C, the UE may only need to know the periodicity of the measurement and/or the ABS pattern.

In certain feedback modes that are defined in 3GPP LTE Rel-8/9, multiple reports may be used to convey the CSI. These feedback modes include Physical Uplink Control Channel (PUCCH) feedback modes 1-1, 2-0, and 2-1. For each of these feedback modes, the multiple reports include RI, wideband CQI/PMI, and/or subband CQI.

The reference subframes (as defined in 3GPP LTE Rel-8/9) may be associated with different subframe types in certain configurations of the feedback periodicity and/or offset, as well as the ABS pattern. For example, the different subframe types may include interference-reduced subframes (due to ABS, for example) or normal subframes. Therefore, a number of approaches may be used to solve problems associated with different subframe types.

Approach One: prohibit some configuration combinations. The prohibition of some configuration combinations may mean that all the reference subframes for the reports should be of a single type of subframes. It is noted that since the periodicity and/or offset of the ABS pattern and CSI feedback are defined independently, there may not be enough available combinations to retain implementation flexibility. Therefore, new periodicity of feedback (for example, 4 or 8 ms) may be necessary to provide sufficient flexibility.

Approach Two: leave the determination of subframe type for the UE, which may degrade the performance. For example, if the RI and the PMI/CQI are of different subframe types, the feedback may not be very useful and MIMO performance may be negatively impacted.

Approach Three: inform the UE of the subframes to be used for interference averaging purposes and modify the CSI feedback procedure.

It is noted that for self-contained feedback modes, such as PUCCH mode 1-0 and Physical Uplink Shared Channel (PUSCH) feedback, each feedback report may be used as a reference subframe in the scheduling of other subframes of the same type.

Furthermore, although interference-reduced subframes (due to ABS, for example) have better channel quality, it may still be beneficial that the eNB schedules transmissions in both types of subframes. For self-contained feedback modes, eNB scheduling may be implemented either through configuration of ABS pattern and feedback period and/or offset, or by sending CQI triggers at certain times. Alternatively, multiple feedback processes may be configured, e.g., a first for interference-reduced subframes and a second for normal subframes. The use of multiple feedback processes may be needed for non-self-contained feedback modes.

In a resource specific measurement mode, the eNB may configure a time and/or frequency observation interval for the UE to use to derive the channel and/or interference values from a specific subframe and/or frequency resource. Therefore, the UE may be configured to average interference in frequency across specific PRBs for the purpose of generating CSI reports. When so configured, the PRBs may be aligned with the frequency granularity of feedback mode of the UE.

Additionally, the UE may be configured and explicitly signaled about which subframes interference can be averaged in time for a CSI report process. Hence, multiple CSI report processes may be configured for a UE, with the multiple CSI report processes potentially being separate or independent processes. The signaling from the eNB to the UE, which may include CQI feedback configuration, for example, may be sent using RRC messages.

In a situation with aperiodic feedback on a PUSCH, the subframes for interference averaging include the reference subframe and the other subframes of the same or similar type. The information about the reference subframe and the other subframes may be explicitly signaled. Therefore, whether the CSI report is for interference-reduced subframes or normal subframes, the CSI report may be implicitly defined by the timing of a trigger (e.g., a CQI trigger).

In a situation with periodic feedback on a PUCCH, several options exist regarding subframe type and subframe type signaling. Option 1: the subframes for interference averaging include all the reference subframes of a report process as well as the other subframes of the same or similar type. The information about the subframe type may be signaled Option 2: the subframes to be used for interference averaging for a report process may be all explicitly signaled. It is noted that Option 1 requires that all the reference subframes are of a single type which may lead to problems. In addition, Option 1 may be implemented using Option 2 if the subframes are properly defined. According to an example embodiment, the subframes for interference averaging are explicitly signaled.

Signal measurements and/or estimations may be based on CRS or CSI-RS, depending on the configured transmission mode. In case of signal measurements and/or estimations with CRS, since the CRS are present in every subframe, the CRS may be separated into two groups corresponding to the subframe types: a) CRS of the interference-reduced subframe and b) CRS of the normal subframe. Although a report process may only use the CRS of the subframe type that was intended for feedback, the use of the subframe type may be left as an implementation choice. For example, a report process for normal subframes may use CRS of the interference-reduced subframes because of their generally better SINR, although longer delay may occur. In order to allow the UE to do so, it is assumed that the UE is informed regarding the interference-reduced subframes and/or ABS pattern.

In the case of signal measurements and/or estimations with CSI-RS, which are present only in certain subframes, such as only interference-reduced subframes, only normal subframes, or a combination thereof, there may be no need to define the CSI-RS of specific subframe types for signal estimation, and no need to have multiple CSI-RS configurations for multiple report processes. This may be due to Physical Downlink Shared Channel (PDSCH) muting for CSI-RS, leading to no or very little difference in SINR between the CSI-RS in different types of subframes.

FIG. 7 illustrates a flow diagram of eNB operations 700 for transmitting to a UE that an eNB is serving, wherein the eNB and the UE are operating in a heterogeneous communications system. eNB operations 700 may be indicative of operations occurring in the eNB of the heterogeneous communications system as the eNB participates in communications with UEs that it is serving, such as the UE, while trying to reduce interference to other UEs. eNB operations 700 may occur while the eNB is in a normal operating mode.

eNB operations 700 may begin with the eNB specifying where and when UEs that it is serving are to perform measurements in order to provide channel information to the eNB (block 705). As an illustrative example, the eNB may specify where (such as which frequency, frequencies, subset or group of frequencies, or so forth) and/or when (such as which time, times, or subset or group of times; which subframe, subframes, or subset or group of subframes; or so on) the UEs are to perform measurements. In addition to where and/or when the measurements are to take place, the eNB may specify how the measurements are to take place, such as averaging, filtering, and so on. Depending on operating mode and available reference signals, the eNB may make use of the techniques described previously. According to an example embodiment, the eNB may specify the where and the when to the UE in the form of a bitmap or bitmaps.

The eNB may then transmit a reference signal(s) (block 710). The reference signal(s) may be a common signal to be used by all served UEs or a group of served UEs. According to an example embodiment, the reference signal(s) may be intended for a specific UE. According to yet another example embodiment, the reference signal(s) may be precoded or unprecoded. According to yet another example embodiment, the reference signal(s) may be a combination of common or specific, precoded or unprecoded, or so forth.

The eNB may then receive a measurement report(s) from the UE (block 715). The measurement report may contain information regarding a channel between the eNB and the UE, e.g., channel information. As an example, the information may include interference information, SINR, SNR, preferred beam (or beam group) information, and so on. The eNB may make use of the measurement report(s) from the UE along with other measurement reports from other UEs to schedule transmissions for UEs (block 720). The eNB may then transmit to schedule UEs at scheduled network resources (block 725). eNB operations 700 may then terminate.

FIG. 8 illustrates a flow diagram of UE operations 800 in receiving transmissions from an eNB serving a UE. UE operations 800 may be indicative of operations occurring in a UE that is served by an eNB, where both the UE and the eNB are operating in a heterogeneous communications system and the eNB attempts to reduce interference to other UEs and eNBs in the heterogeneous communications system. Multiple instances of UE operations 800 may be executing on a single UE. UE operations 800 may occur while the UE is in a normal operating mode.

UE operations 800 may begin with the UE receiving information from the eNB pertaining to where and/or when to make measurements of a channel between the eNB and the UE (block 805). The information from the eNB may be in any of the forms of information as discussed previously. As an example, the UE may receive a bitmap or bitmaps specifying the where and the when to make measurements. Furthermore, the UE may receive information as to how to make the measurements, for example, average the measurements, filter the measurements, and so on. At the where and/or the when as specified by the eNB, the UE may make a measurement of the channel (block 810). The UE may make use of a reference signal(s) transmitted by the eNB to help it make the measurement. The reference signal(s) may be common or specific, precoded or unprecoded, or a combination thereof.

The UE may then report channel information related to its measurement, information from the measurement, a subset of information from the measurement, an indicator based on the measurement, and so on, to the eNB (block 815). The UE may then receive a transmission from the eNB, wherein the transmission was scheduled based on the information reported by the UE (block 820). UE operations 800 may then terminate.

Figure 9:
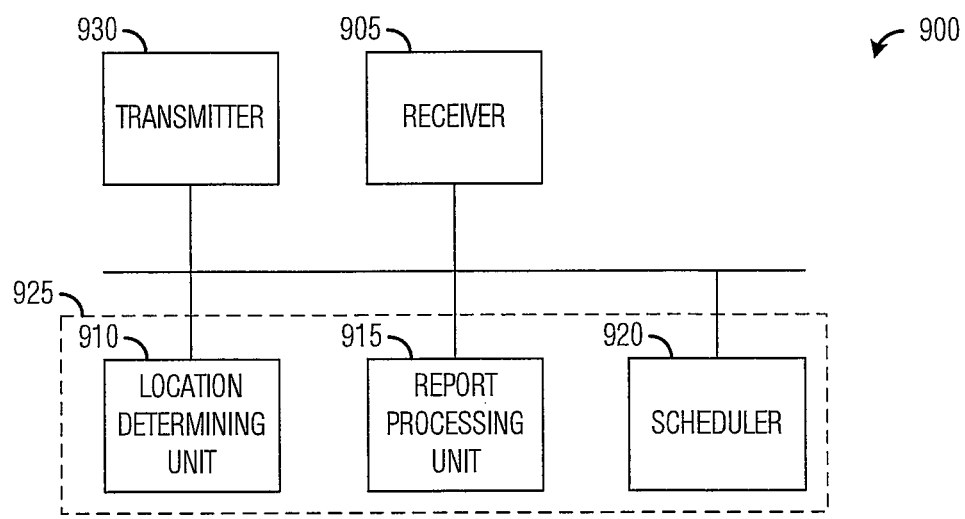
FIG. 9 illustrates an example controller according to example embodiments described herein.

FIG. 9 provides an alternate illustration of a controller 900. Controller 900 may be used to implement various ones of the embodiments discussed herein. As shown in FIG. 9, a receiver 905 is configured to receive information. A location determine unit 910 is configured to determine a location (where, when, period, and so on) of network resources that a communications device is supposed to measure and to report results from the measurements to help controller 900 communicate with the communications device with reduced interference to other communications devices. Location determining unit 910 may also determine which reference sequence to use as well as processing, such as averaging, to be performed by the communications device. Report processing unit 915 is configured to process measurement reports provided by the communications device.

Scheduler 920 is configured to schedule transmissions to and transmission opportunities for the communications device. Scheduler 920 may make use of measurement reports from the communications device (as well as measurement reports from other communications devices and/or information shared by other controllers) to schedule the transmission or transmission opportunities for the communications device. Scheduler 920 may use any of a wide variety of scheduling techniques, such as proportional fair, maximum throughput, and so forth. Transmitter 930 may be used to transmit messages.

The elements of controller 900 may be implemented as specific hardware logic blocks. In an alternative, the elements of controller 900 may be implemented as software executing in a processor, controller, application specific integrated circuit, or so on. In yet another alternative, the elements of controller 900 may be implemented as a combination of software and/or hardware.

As an example, receiver 905 and transmitter 930 may be implemented as specific hardware blocks, while location determining unit 910, report processing unit 915, and scheduler 920 may be software modules executing in a processor 925 or custom compiled logic arrays of a field programmable logic array.

Figure 10:
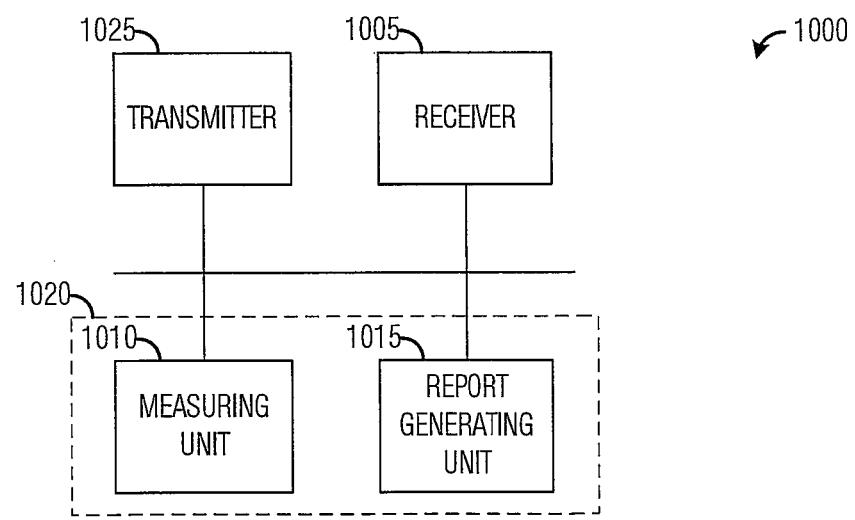
FIG. 10 illustrates an example user equipment according to example embodiments described herein.

FIG. 10 provides an alternate illustration of a user equipment 1000. User equipment 1000 may be used to implement various ones of the embodiments discussed herein. As shown in FIG. 10, a receiver 1005 is configured to receive information. A measuring unit 1010 is configured to make measurement at network resources specified by a controller serving user equipment 1000. Measuring unit 1010 may also perform processing on results of the measurement, including averaging, and so on. A report generating unit 1015 is configured to generate a report for transmission to the controller. The report may include raw results of the measurements, a subset of the results of the measurements, an indication of the results of the measurement, and so on. Report generating unit 1015 may have multiple reporting processes executing at a given time. Transmitter 1025 may be used to transmit messages, such as the measurement report.

The elements of user equipment 1000 may be implemented as specific hardware logic blocks. In an alternative, the elements of user equipment 1000 may be implemented as software executing in a processor, controller, application specific integrated circuit, or so on. In yet another alternative, the elements of user equipment 1000 may be implemented as a combination of software and/or hardware.

As an example, receiver 1005 and transmitter 1025 may be implemented as specific hardware blocks, while measuring unit 1010, and report generating unit 1015 may be software modules executing in a processor 1020 or custom compiled logic arrays of a field programmable logic array.

Advantageous features of embodiments of the invention may include: a method for communication controller operations, the method comprising determining a communications resource for measurement by a communications device; signaling the communications resource to the communications device; transmitting a reference signal; receiving a report from the communications device, wherein the report comprises a result of a measurement at the communications resource; and controlling the communications device based on the report. The method could further include, wherein determining a communications resource comprises specifying a start of a measurement period. The method could further include, wherein a configuration of the measurement period is known at the communications device. The method could further include, wherein determining a communications resource comprises specifying a period of a measurement period.

The method could further include, wherein a configuration of the measurement period is known at the communications device. The method could further include, wherein determining a communications resource comprises specifying a start of a measurement period and a duration of the measurement period. The method could further include, wherein the start of the measurement period comprises a time value and a frequency value. The method could further include, wherein the communications device is served by a communications controller, wherein the communications controller serves a plurality of communications devices, and wherein the specifying is for all communications devices served by the controller. The method could further include, wherein the communications device is served by a communications controller, wherein the communications controller serves a plurality of groups of communications devices, and wherein the specifying is for all communications devices of a group of communications devices served by the communications controller.

The method could further include, wherein the communications device is served by a communications controller, wherein the controller serves a plurality of communications devices, and wherein the specifying is for the communications device. The method could further include, wherein determining a communications resource comprises specifying a set of subframes and/or a set of subbands. The method could further include, wherein specifying a set of subframes and/or a set of subbands further comprises specifying a measurement period N, where N is a positive integer value. The method could further include, wherein signaling the communications resource comprises signaling an indication of the communications resource, and wherein the indication comprises a bitmap of the set of subframes and/or the set of subbands.

The method could further include, wherein there is a plurality of communications resources, and wherein the communications resources in the plurality of communications resources are standardized, and wherein determining a communications resource comprises selecting a communications resource from the plurality of communications resources. The method could further include, wherein signaling the communications resource comprises transmitting a resource indication of the selected communications resource. The method could further include, wherein the plurality of communications resources is stored in an indexed table, and wherein the resource indication comprises an index to the indexed table.

The method could further include, wherein the resource indication comprises a communications resource of where to not make a measurement. The method could further include, further comprising signaling a beam pattern of beams used to transmit, and wherein determining a location comprises selecting a beam from the beam pattern of beams. The method could further include, wherein signaling the communications resource comprises transmitting an index of the selected beam. The method could further include, wherein signaling the communications resource comprises sending a message to the communications device, where the message comprises information related to the communications resource. The method could further include, wherein signaling the communications resource comprises sending a poll message to the communications device, where the poll message comprises information related to the communications resource and when the measurement is to take place. The method could further include, wherein the reference signal is a common reference signal, a specific reference signal, a precoded reference signal, an unprecoded reference signal, or a combination thereof.

Advantageous features of embodiments of the invention may include: a method of communications controller operations, the method comprising determining a communications resource for measurement by a communications device; signaling the communications resource to the communications device; transmitting a reference signal; receiving a report from the communications device, wherein the report comprises a result of a measurement at the communications resource; and controlling the communications device based on the report. The method could further include, wherein the reference signal is a communications device specific signal. The method could further include, wherein the report comprises CQI and/or PMI. The method could further include, wherein the reference signal is precoded for the communications device. The method could further include, wherein the report comprises CQI only.

The method could further include, wherein the reference signal is a communications device group specific signal, and wherein the reference signal is precoded for the communications device group. The method could further include, wherein the communications resource is signaled to each communications device in the communications device group. The method could further include, wherein the reference signal is a cell specific signal. The method could further include, wherein the reference signal is periodic, and wherein the communications resource specifies measurement locations. The method could further include, wherein the reference signal is always transmitted, and wherein the communications resource specifies a measurement period. The method could further include, wherein the communications resource further specifies a start of the measurement period.

Advantageous features of embodiments of the invention may include: a method for communications controller operation, the method comprising determining a communications resource for measurement by a communications device; signaling the communications resource to the communications device; transmitting a reference signal; receiving a report from the communications device, wherein the report comprises a result of a measurement at the communications resource; and controlling the communications device based on the report. The method could further include, wherein network resources of a communications are partitioned into a plurality of beam groups, and wherein a priority is assigned to each beam group.

The method could further include, wherein controlling the communications device comprises scheduling a transmission for the communications device. The method could further include, wherein scheduling a transmission comprises scheduling the transmission if a beam group's priority is equal to a first threshold. The method could further include, wherein scheduling the transmission further occurs if the beam group's priority exceeds the first threshold. The method could further include, wherein scheduling a transmission comprises buffering the transmission if the beam group's priority is equal to a second threshold.

Advantageous features of embodiments of the invention may include: a communication controller comprising a determining unit, configured to determine a communications resource for measurement by a communications device; a signaling unit, configured to signal the communications resource to the communications device; a transmitter, configured to transmit a reference signal; a receiver, configured to receive a report from the communications device, wherein the report comprises a result of a measurement at the communications resource; and a controlling unit, configured to control the communications device based on the report.

Advantageous features of embodiments of the invention may include: a communications controller comprising a determining unit, configured to determine a communications resource for measurement by a communications device; a signaling unit, configured to signal the communications resource to the communications device; a transmitter, configured to transmit a reference signal; a receiver, configured to receive a report from the communications device, wherein the report comprises a result of a measurement at the communications resource; and a controlling unit, configured to the communications device based on the report.

Advantageous features of embodiments of the invention may include: a communications controller comprising a determining unit, configured to determine a communications resource for measurement by a communications device; a signaling unit, configured to signal the communications resource to the communications device; a transmitter, configured to transmit a reference signal; a receiver, configured to receive a report from the communications device, wherein the report comprises a result of a measurement at the communications resource; and a controlling unit, configured to control the communications device based on the report.

Advantageous features of embodiments of the invention may include: a method for communication controller operations, the method comprising: determining a communications resource for measurement by a communications device; signaling the communications resource to the communications device; transmitting a reference signal; receiving a report from the communications device, wherein the report comprises a result of a measurement at the communications resource; and controlling the communications device based on the report.

The method could further include, wherein determining a communications resource comprises specifying a start of a measurement period. The method could further include, wherein a configuration of the measurement period is known at the communications device. The method could further include, wherein determining a communications resource comprises specifying a period of a measurement period. The method could further include, wherein a configuration of the measurement period is known at the communications device. The method could further include, wherein determining a communications resource comprises specifying a start of a measurement period and a duration of the measurement period.

The method could further include, wherein the start of the measurement period comprises a time value and a frequency value. The method could further include, wherein the communications device is served by a communications controller, wherein the communications controller serves a plurality of communications devices, and wherein the specifying is for all communications devices served by the controller. The method could further include, wherein the communications device is served by a communications controller, wherein the communications controller serves a plurality of groups of communications devices, and wherein the specifying is for all communications devices of a group of communications devices served by the communications controller. The method could further include, wherein the communications device is served by a communications controller, wherein the controller serves a plurality of communications devices, and wherein the specifying is for the communications device.

The method could further include, wherein determining a communications resource comprises specifying a set of subframes and/or a set of subbands. The method could further include, wherein specifying a set of subframes and/or a set of subbands further comprises specifying a measurement period N, where N is a positive integer value. The method could further include, wherein signaling the communications resource comprises signaling an indication of the communications resource, and wherein the indication comprises a bitmap of the set of subframes and/or the set of subbands. The method could further include, wherein there is a plurality of communications resources, and wherein the communications resources in the plurality of communications resources are standardized, and wherein determining a communications resource comprises selecting a communications resource from the plurality of communications resources.

The method could further include, wherein signaling the communications resource comprises transmitting a resource indication of the selected communications resource. The method could further include, wherein the plurality of communications resources is stored in an indexed table, and wherein the resource indication comprises an index to the indexed table. The method could further include, wherein the resource indication comprises a communications resource of where to not make a measurement. The method could further include, further comprising signaling a beam pattern of beams used to transmit, and wherein determining a location comprises selecting a beam from the beam pattern of beams.

The method could further include, wherein signaling the communications resource comprises transmitting an index of the selected beam. The method could further include, wherein signaling the communications resource comprises sending a message to the communications device, where the message comprises information related to the communications resource. The method could further include, wherein signaling the communications resource comprises sending a poll message to the communications device, where the poll message comprises information related to the communications resource and when the measurement is to take place. The method could further include, wherein the reference signal is a common reference signal, a specific reference signal, a precoded reference signal, an unprecoded reference signal, or a combination thereof.

Advantageous features of embodiments of the invention may include: a method of communications controller operations, the method comprising: determining a communications resource for measurement by a communications device; signaling the communications resource to the communications device; transmitting a reference signal; receiving a report from the communications device, wherein the report comprises a result of a measurement at the communications resource; and controlling the communications device based on the report.

The method could further include, wherein the reference signal is a communications device specific signal. The method could further include, wherein the report comprises CQI and/or PMI. The method could further include, wherein the reference signal is precoded for the communications device. The method could further include, wherein the report comprises CQI only. The method could further include, wherein the reference signal is a communications device group specific signal, and wherein the reference signal is precoded for the communications device group.

The method could further include, wherein the communications resource is signaled to each communications device in the communications device group. The method could further include, wherein the reference signal is a cell specific signal. The method could further include, wherein the reference signal is periodic, and wherein the communications resource specifies measurement locations. The method could further include, wherein the reference signal is always transmitted, and wherein the communications resource specifies a measurement period. The method could further include, wherein the communications resource further specifies a start of the measurement period.

Advantageous features of embodiments of the invention may include: a method for communications controller operation, the method comprising: determining a communications resource for measurement by a communications device; signaling the communications resource to the communications device; transmitting a reference signal; receiving a report from the communications device, wherein the report comprises a result of a measurement at the communications resource; and controlling the communications device based on the report.

The method could further include, wherein network resources of a communications are partitioned into a plurality of beam groups, and wherein a priority is assigned to each beam group. The method could further include, wherein controlling the communications device comprises scheduling a transmission for the communications device. The method could further include, wherein scheduling a transmission comprises scheduling the transmission if a beam group's priority is equal to a first threshold. The method could further include, wherein scheduling the transmission further occurs if the beam group's priority exceeds the first threshold. The method could further include, wherein scheduling a transmission comprises buffering the transmission if the beam group's priority is equal to a second threshold.

Advantageous features of embodiments of the invention may include: a communication controller comprising: a determining unit, configured to determine a communications resource for measurement by a communications device; a signaling unit, configured to signal the communications resource to the communications device; a transmitter, configured to transmit a reference signal; a receiver, configured to receive a report from the communications device, wherein the report comprises a result of a measurement at the communications resource; and a controlling unit, configured to control the communications device based on the report.

Advantageous features of embodiments of the invention may include: a communications controller comprising: a determining unit, configured to determine a communications resource for measurement by a communications device; a signaling unit, configured to signal the communications resource to the communications device; a transmitter, configured to transmit a reference signal; a receiver, configured to receive a report from the communications device, wherein the report comprises a result of a measurement at the communications resource; and a controlling unit, configured to the communications device based on the report.

Advantageous features of embodiments of the invention may include: a method for communications controller operation, the method comprising: a determining unit, configured to determine a communications resource for measurement by a communications device; a signaling unit, configured to signal the communications resource to the communications device; a transmitter, configured to transmit a reference signal; a receiver, configured to receive a report from the communications device, wherein the report comprises a result of a measurement at the communications resource; and a controlling unit, configured to control the communications device based on the report.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of operating a communications controller, the method comprising:
    signaling an indicator of a subset of a plurality of communications resources controlled by the communications controller to a user equipment, wherein the indicator comprises a plurality of bitmaps, wherein each bitmap of the plurality of bitmaps indicates a different subset of the plurality of communications resources, and wherein the communications resources are subframes; and
    receiving a report comprising channel information associated with a measurement of signals transmitted in the subset from the user equipment.

2. The method of claim 1, wherein the signals comprise a first transmission made by the communications controller, a second transmission made by another communications controller, or a combination thereof.

3. The method of claim 1, wherein receiving the report comprises receiving a respective report for each bitmap in the plurality of bitmaps.

4. The method of claim 3, wherein receiving the respective report for each bitmap comprises receiving channel information associated with the measurement of signals transmitted in the subset of the plurality of communications resources indicated by the each bitmap.

5. The method of claim 3, wherein the report for each bitmap is received from a separate reporting process at the user equipment.

6. The method of claim 3, wherein the report for each bitmap comprises a channel quality indicator, a precoding matrix indicator, a rank indicator, or a combination thereof.

7. The method of claim 1, wherein each bitmap of the plurality of bitmaps comprises at least one bit corresponding to a communications resource, wherein the at least one bit is set to a first value or a second value, and wherein the first value indicates that the user equipment will measure the signals transmitted in the communications resource and the second value indicates that the user equipment will not measure the signals transmitted in the communications resource.

8. The method of claim 1, wherein there is a plurality of user equipments, and wherein a plurality of subsets of the plurality of communications resources is configured for each user equipment.

9. The method of claim 1, wherein there is a plurality of user equipments, and wherein there are either zero or two subsets of the plurality of communications resources configured for each respective user equipment.

10. The method of claim 1, wherein signaling the indicator comprises signaling the indicator by higher layer signaling.

11. The method of claim 10, wherein the higher layer signaling comprises radio resource control signaling.

12. The method of claim 1, wherein signaling the indicator comprises signaling additional information for the user equipment.

13. The method of claim 12, wherein the additional information comprises a filtering indicator, an averaging indicator, or a combination thereof.

14. A method for operating a user equipment, the method comprising:
    receiving an indicator of a subset of a plurality of communications resources controlled by a communications controller from the communications controller, wherein the indicator indicates to the user equipment to measure signals transmitted in the subset, wherein the indicator comprises a plurality of bitmaps, wherein each bitmap of the plurality of bitmaps indicates a different subset of the plurality of communications resources, and wherein the communications resources are subframes;
    measuring the signals transmitted in the subset; and
    reporting channel information associated with the measuring to the communications controller.

15. The method of claim 14, wherein the plurality of bitmaps each comprises at least one bit corresponding to a communications resource, wherein the at least one bit is set to a first value or a second value, and wherein the first value indicates that the user equipment will measure the signals transmitted in the communications resource and the second value indicates that the user equipment will not measure the signals transmitted in the communications resource.

16. The method of claim 14, wherein the plurality of bitmaps each comprises at least one bit corresponding to an indicated subset of communications resources out of a plurality of subsets of communications resources, wherein the at least one bit is set to a first value or a second value, and wherein the first value indicates that the user equipment will measure the signals transmitted in the indicated subset of communications resources and the second value indicates that the user equipment will not measure the signals transmitted in the indicated subset of communications resources.

17. The method of claim 16, wherein there is a plurality of user equipments, and wherein a plurality of subsets of communications resources is configured for each user equipment.

18. The method of claim 16, wherein there is a plurality of user equipments, and wherein there are either zero or two subsets of communications resources configured for each respective user equipment.

19. The method of claim 14, wherein the indicator further comprises a filtering indicator, an averaging indicator, or a combination thereof, and wherein the method further comprises filtering the measurement or averaging the measurement.

20. The method of claim 14, wherein reporting the channel information comprises transmitting the channel information on a feedback channel.

21. The method of claim 14, wherein reporting the channel information comprises an indication of the channel information, a subset of the channel information, a function of the channel information, or a combination thereof.

22. The method of claim 14, wherein there is a plurality of indicators, and wherein the user equipment separately measures the signals and reports channel information for each indicator in the plurality of indicators.

23. A communications controller comprising:
a processor configured to determine a subset of a plurality of communications resources controlled by the communications controller, and configured to generate an indicator of the subset, wherein the indicator comprises a plurality of bitmaps, wherein each bitmap of the plurality of bitmaps indicates a different subset of the plurality of communications resources, and wherein the communications resources are subframes;
a transmitter coupled to the processor, the transmitter configured to transmit the indicator to a user equipment; and
a receiver coupled to the processor, the receiver configured to receive a report comprising channel information associated with a measurement of signals transmitted in the subset from the user equipment.

24. The communications controller of claim 23, wherein the indicator further comprises a filtering indicator, an averaging indicator, or a combination thereof.

25. The communications controller of claim 23, wherein each bitmap of the plurality of bitmaps comprises at least one bit corresponding to a communications resource, wherein the at least one bit is set to a first value or a second value, and wherein the first value indicates that the user equipment will measure the signals transmitted in the communications resource and the second value indicates that the user equipment will not measure the signals transmitted in the communications resource.

26. A user equipment comprising:
a receiver configured to receive an indicator of a subset of a plurality of communications resources controlled by a communications controller from the communications controller, wherein the indicator indicates that the user equipment is to measure signals transmitted in the subset, wherein the indicator comprises a plurality of bitmaps, wherein each bitmap of the plurality of bitmaps indicates a different subset of the plurality of communications resources, and wherein the communications resources are subframes;
a processor coupled to the receiver, the processor configured to measure the signals transmitted in the subset, and to generate channel information based on the measurement; and
a transmitter coupled to the processor, the transmitter configured to transmit the channel information to the communications controller.

27. The user equipment of claim 26, wherein wherein each bitmap comprises at least one bit corresponding to a communications resource, wherein the at least one bit is set to a first value or a second value, and wherein the first value indicates that the user equipment will measure the signals transmitted in the communications resource and the second value indicates that the user equipment will not measure the signals transmitted in the communications resource.

28. The user equipment of claim 26, wherein the indicator further comprises a filtering indicator, an averaging indicator, or a combination thereof, and wherein the processor is further configured to filter the measurement or to average the measurement.

29. The user equipment of claim 26, wherein the processor is configured to generate the channel information comprising a result of the measurement, an indication of the result of the measurement, a subset of the result of the measurement, a function of the result of the measurement, or a combination thereof.

* * * * *

UNITED STATES PATENT AND TRADEMARK OFFICE
CERTIFICATE OF CORRECTION

PATENT NO. : 9,014,025 B2  
APPLICATION NO. : 13/252646  
DATED : April 21, 2015  
INVENTOR(S) : Oghenekome Oteri Page 1 of 1

It is certified that error appears in the above-identified patent and that said Letters Patent is hereby corrected as shown below:

In the Claims

In Col. 24, line 27, claim 27, delete "wherein wherein each" and insert --wherein each--.

Signed and Sealed this
Eighteenth Day of August, 2015

Michelle K. Lee
*Director of the United States Patent and Trademark Office*